US012710559B2

(12) United States Patent
Patwa et al.

(10) Patent No.: US 12,710,559 B2
(45) Date of Patent: Aug. 18, 2026

(54) PLACEMENT OF ISOLATOR AND ELECTRONICS IN SAME COLLAR SECTION TO REDUCE TOOL LENGTH

(71) Applicant: Halliburton Energy Services, Inc., Houston, TX (US)

(72) Inventors: Ruchir Shirish Patwa, Sugar Land, TX (US); Akshay Girish Khandekar, Houston, TX (US); Jiajun Zhao, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 717 days.

(21) Appl. No.: 18/121,251

(22) Filed: Mar. 14, 2023

(65) Prior Publication Data

US 2024/0310549 A1 Sep. 19, 2024

(51) Int. Cl.
*G01V 1/52* (2006.01)
*E21B 49/00* (2006.01)

(52) U.S. Cl.
CPC .............. *G01V 1/523* (2013.01); *E21B 49/00* (2013.01)

(58) Field of Classification Search
CPC ........ G01V 1/523; E21B 49/00; E21B 47/017
See application file for complete search history.

(56) References Cited

U.S. PATENT DOCUMENTS

2005/0173185 A1* 8/2005 Pabon .................... G01V 1/523 181/108
2008/0149415 A1 6/2008 Botting
2010/0208552 A1* 8/2010 Camwell .............. G01V 11/002 367/82
2016/0252639 A1 9/2016 Chang et al.
2023/0026433 A1* 1/2023 Schimschal ............ G01V 1/523
2024/0310549 A1* 9/2024 Patwa ..................... E21B 49/00

FOREIGN PATENT DOCUMENTS

AU 2004208724 B2 * 3/2008 ............. G01V 1/523
RU 2749874 C1 * 6/2021 ......... E21B 33/1204
WO WO-2024191421 A1 * 9/2024 ........... E21B 47/017

OTHER PUBLICATIONS

International Search Report & Written Opinion; PCT Application No. PCT/US2023/015242; Mailed Dec. 5, 2023.

* cited by examiner

*Primary Examiner* — Daniel Pihulic
(74) *Attorney, Agent, or Firm* — NOVAK DRUCE CARROLL LLP

(57) ABSTRACT

Aspects of the subject technology relate to downhole sensing system are disclosed. The system has a first collar configured to accept a receiver, a second collar configured to accept a transmitter; and an acoustic isolator disposed between the first collar and the second collar. The acoustic isolator has a tubular body with a generally smooth exterior surface and an interior surface with a plurality of circumferential grooves formed in the interior surface that modify the acoustic impedance of the tubular body, thereby attenuating an acoustic signal passing through the tubular body.

18 Claims, 4 Drawing Sheets

(area A of Fig. 3)

(section A-A from Fig. 5)

(section B-B from Fig. 5)

PLACEMENT OF ISOLATOR AND ELECTRONICS IN SAME COLLAR SECTION TO REDUCE TOOL LENGTH

TECHNICAL FIELD

The present technology pertains to downhole sensing systems and, more particularly, to sonic tools that emit and detect acoustic signals so as to characterize the substrate surrounding a wellbore.

BACKGROUND

Acoustic or sonic logging tools are often employed in wellbore environments for a variety of purposes, including formation measurements and material characterizations. In general, acoustic logging tools are disposed in a borehole and operate to generate/receive signals and measure signal responses (or signal dispersions) for different target modes. The signal responses or signal dispersions for a given target mode are analyzed to determine various geophysical and mechanical properties of the borehole and adjacent formations. Signal dispersions are often characterized by a relationship between signal wave slowness (μs/ft) and signal wave frequency, which provides insight into material-types and geometric properties of the borehole and adjacent formations. Put differently, a number of borehole modal waves are dispersive modes, whose propagating speed varies with frequency. The dispersion of borehole waves carries essential information about the formations and borehole fluid; therefore, extracting the dispersion properties of modal waves is a primary task of sonic data processing.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
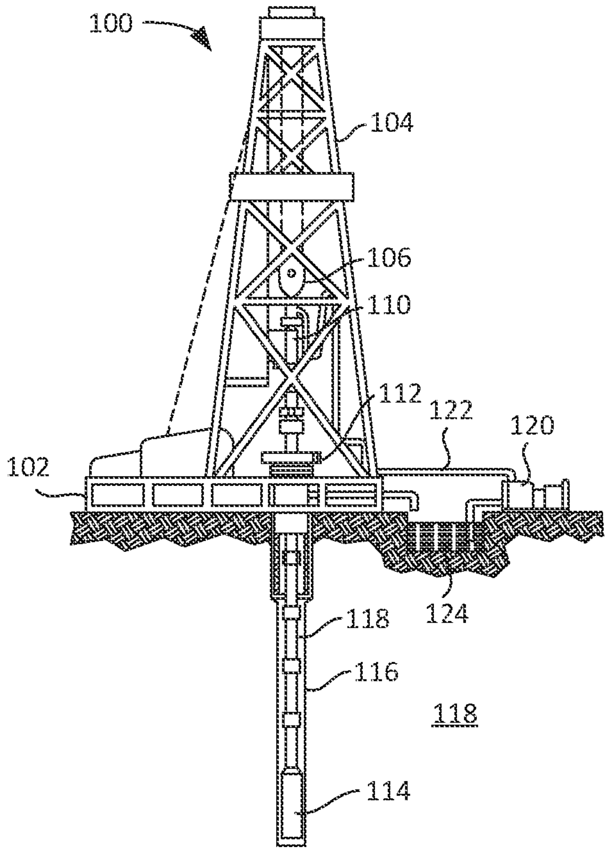
FIG. 1 is a schematic diagram of a typical wellbore drilling scenario, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

One method used to analyze the structure and composition of the subterranean substrate in which a wellbore has been drilled is to lower an acoustic sensing system into the wellbore. The typical sensing system includes an acoustic emitter and one or more acoustic sensors. The emitter sends an acoustic signal outward into the substrate, wherein the signal is reflected by various structures, for example a boundary between a layer of rock and a layer of sand. Conventional tool designs have the electronics driving the emitter placed outboard of the emitter and the electronics driving the sensors placed outboard of the sensors. This placement makes the acoustic sensing system long and costly, as the structure of the sensing system is typically made of an expensive metal such as Inconel. Conventional tools also experience significant self-generated “noise” because a portion of the emitted acoustic signal is conducted through the structural body of the tool directly from the emitter to the sensors. The systems and methods disclosed herein improve these issues.

The disclosed system places the electronics associated with the emitter and/or the sensors, thereby achieving a shorter total system compared to conventional designs. The design of the structure between the emitter and the sensors improves the attenuation of conducted acoustic waves compared to conventional designs. In addition, a spacer ring has been introduced between the transmitter and receiver sections. The spacer ring has a different speed of sound than the materials of the transmitter and receiver sections and the acoustic waves are modified while passing through the boundaries between these dissimilar materials such that the conducted signals can be better distinguished from the reflected signals coming back from the substrate, thereby enabling them to be filtered out and improving the quality of the data from the system.

Turning now to FIG. 1A, a typical drilling arrangement 100 is shown in schematic form, in accordance with various aspects of the subject technology. A drilling platform 102 is equipped with a derrick 104 that supports a hoist 106 for raising and lowering a drill string 108. The hoist 106 suspends a top drive 110 suitable for rotating and lowering the drill string 108 through a well head 112 to create a wellbore 116 that passes through one or more subterranean substrates 118. A pump 120 circulates drilling fluid through a supply pipe 122 to top drive 110, down through the interior of drill string 108 and into the wellbore 116. The drilling fluid returns to the surface via the annulus around drill string 108, and into a retention pit 124. The drilling fluid transports cuttings from the wellbore 116 into the retention pit 124 and the drilling fluid's presence in the annulus aids in maintaining the integrity of the wellbore 116. Once a wellbore 116 has been drilled, a downhole sensing system 114 may be connected to the lower end of the drill string 108 and lowered into the wellbore 116.

Figure 2:
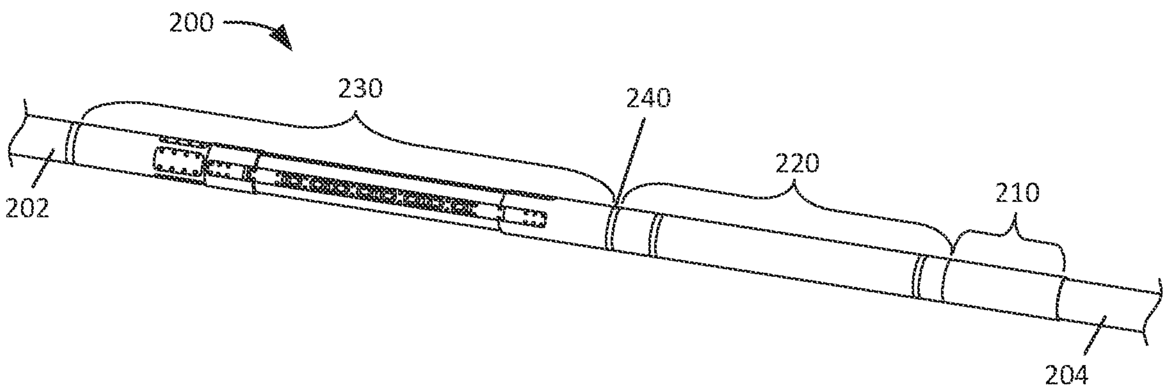
FIG. 2 is a perspective view of an exemplary downhole sensing system, in accordance with various aspects of the subject technology.

FIG. 2 is a perspective view of an exemplary downhole sensing system 200, in accordance with various aspects of the subject technology. This system 200 comprises an acoustic transmitter 210, an acoustic isolator 220, and an acoustic receiver 230. Within this document, the term "collar" is used generically in referring to a drill string assembly, e.g., the receiver 230 may alternately be referred to as collar 230 and the isolator 220 may alternately be referred to as collar 220.

The isolator 220 provides separation of the transmitter 210 from the acoustic receiver 230 as well as damping of acoustic waves being conducted through the structure of isolator 220. In the example of FIG. 2, the isolator 220 is integrated with the transmitter 210. In certain embodiments, the isolator 220 is a separate structure from the transmitter 210 and coupled thereto.

In certain embodiments, a coupler ring 240 is disposed between the isolator 220 and the receiver 230. In this example, the receiver 230 is coupled to an upper drill string section 202 and a lower drill string section 204. The function of the coupler ring 240 is discussed with respect to FIG. 6. In general, the transmitter 210 emits an acoustic signal that penetrates outward into the surrounding substrate 118 and is reflected by various structures and materials therein. The receiver 230 receives a portion of the reflected acoustic signals and transmits information about the received signals to the surface. It is desirable to minimize the acoustic conduction through the structure of the downhole sensing system 200 as any signal conducted from the transmitter to the receiver through the structure interferes with sensing of the substrate 118. The purpose of the isolator 220 is to physically connect the transmitter 210 and the receiver 230 while minimizing acoustic conduction through the isolator 220.

Figure 3:
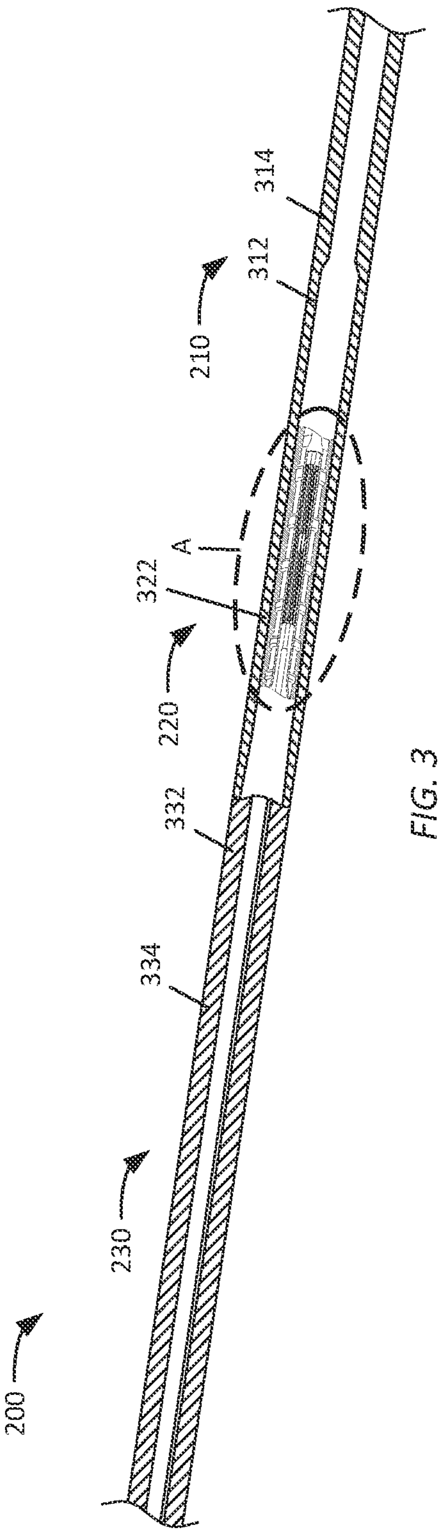
FIG. 3 is a cut-away view of the downhole sensing system of FIG. 2, in accordance with various aspects of the subject technology.

FIG. 3 is a cut-away view of the downhole sensing system 200 of FIG. 2, in accordance with various aspects of the subject technology. The transmitter 210 comprises an emitter 314 arranged around a portion of the exterior of the transmitter body 312. The isolator 220 comprises a tubular isolator body 322. The receiver 230 comprises a plurality of sensors 334 arranged on the surface of receiver body 332.

Figure 4:
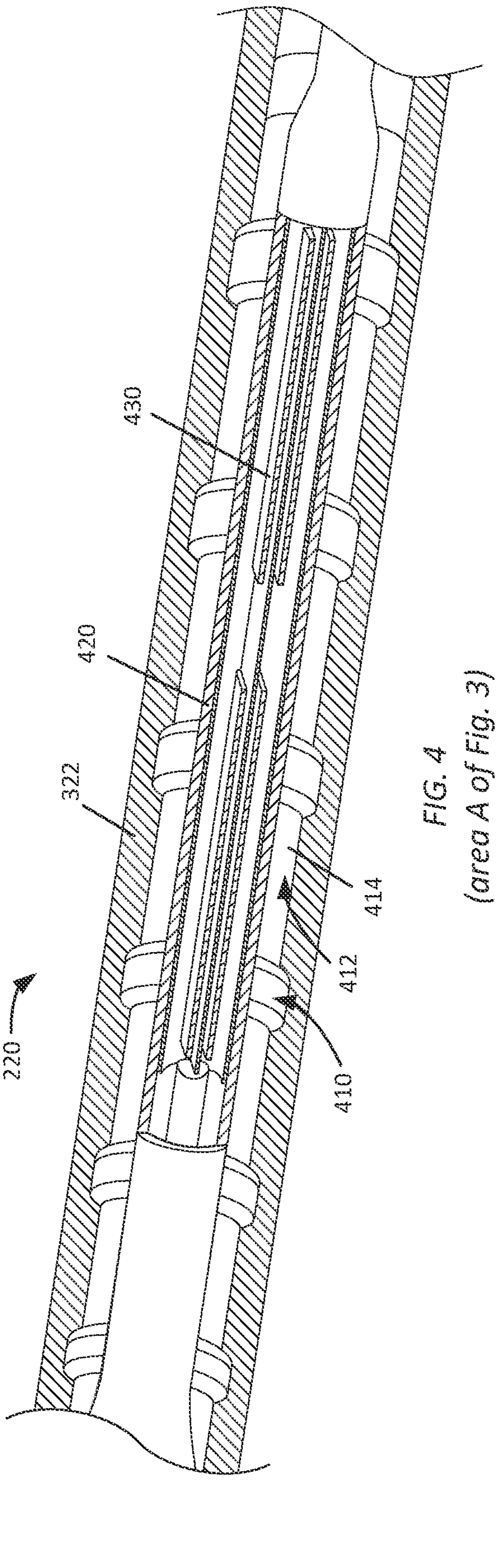
FIG. 4 is an enlarged view of area A of FIG. 3, in accordance with various aspects of the subject technology.

FIG. 4 is an enlarged view of area A of FIG. 3, in accordance with various aspects of the subject technology. The isolator body 322 has an interior space 412 with an interior surface 414 in which are formed a plurality of circumferential grooves 410 that have a respective plurality of widths and a respective plurality of depths.

In certain embodiments, isolator 220 comprises a sonde 420 disposed within the interior space 412. In certain embodiments, the sonde 420 contains an electronics assembly 430. In certain embodiments, the electronics assembly 430 comprises electronics associated with the sensors 334. In certain embodiments, the electronics assembly 430 comprises electronics associated with the emitter 314. In certain embodiments, the electronics assembly 430 comprises electronics associated with sending or receiving information from the drilling platform 102.

Figure 5:
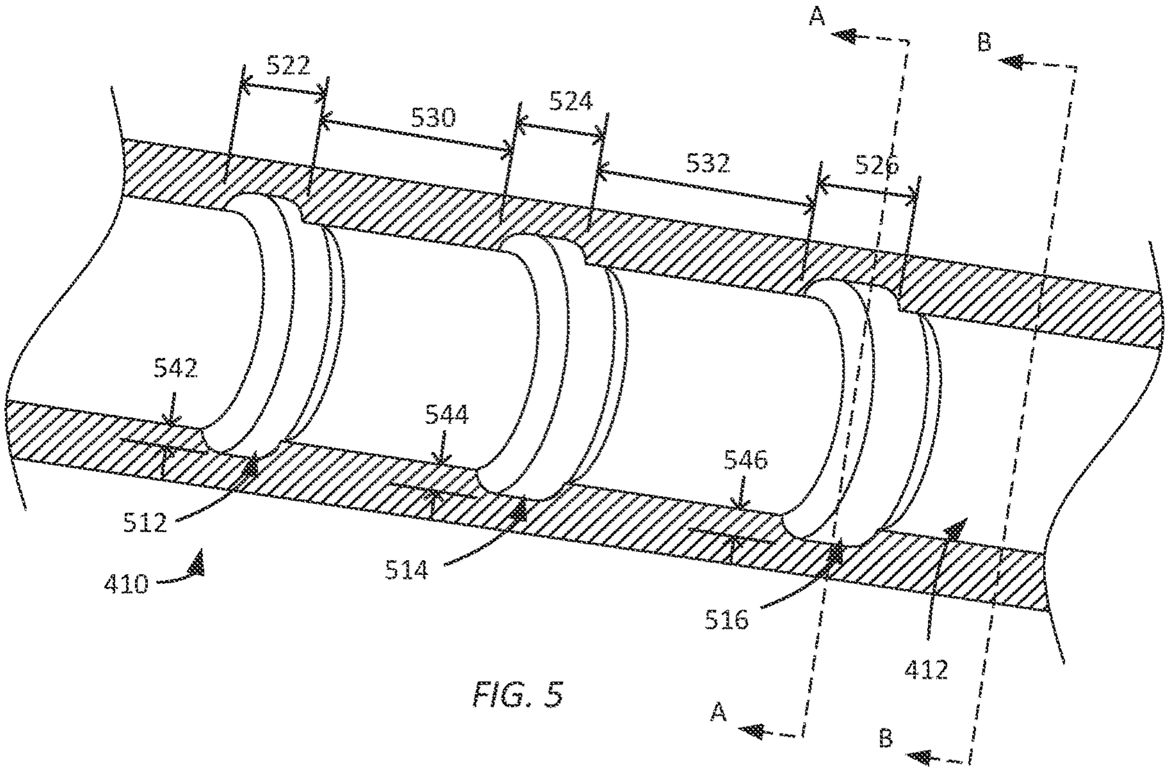
FIG. 5 is a cut-away view of the isolator body, in accordance with various aspects of the subject technology.

FIG. 5 is a cut-away view of the isolator body 322, in accordance with various aspects of the subject technology. Grooves 512, 514, 516 of circumferential grooves 410 are visible in FIG. 5. Groove 512 has a width 522 and depth 542, groove 514 has a width 524 and depth 544, and groove 516 has a width 526 and depth 546. The example grooves 410 have a flat bottom with radiused corners and vertical sides. In certain embodiments, the bottom, corners, and sides include profiles of any shape or size.

Acoustic signals are conducted through gasses, liquids, and solid. Acoustic impedance, which has the symbol Z, is the ratio of acoustic pressure p to acoustic volume flow U. There is a close analogy with electrical impedance, the ratio of AC voltage I' to current I. The acoustic impedance Z is a property of a material, often referred to as the "medium" in acoustics, and a particular geometry. Z varies strongly with frequency.

Figure 6A:
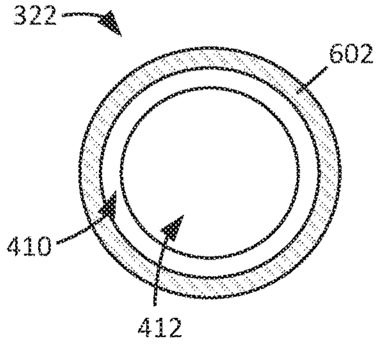
FIGS. 6A-6B depict exemplary cross-sections of the isolator body through a groove and through the body between grooves, in accordance with various aspects of the subject technology.
Figure 6B:
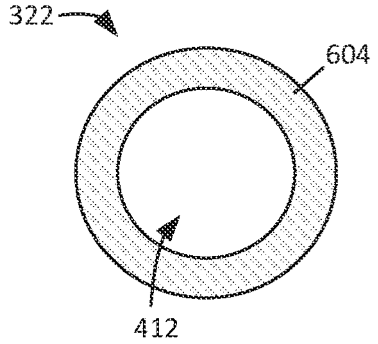

FIGS. 6A-6B depict exemplary cross-sections of the isolator body 322 through a groove 410 and through the body 322 between grooves 410, in accordance with various aspects of the subject technology. Each groove 410 has an "acoustic aperture," which is the area 602 that is outside the ring in the cross-section in the plane of the groove 410. Between the grooves 410, the isolator body 322 has a larger area 604.

The widths, depths, and separation distances between grooves 410 in isolator body 322 effectively form a series of acoustic filters that attenuate sound conducted through the isolator body 322. The transmitter and receiver have a working range of frequencies for the signals returned from the substrate. In certain embodiments, this working range is roughly 7-15 kHz. It is therefore desirable to provide the maximum possible attenuation of acoustic energy conducted through the isolator body 322 over as much of this range as possible. In certain embodiments, it is desirable to provide attenuation over a range of 5-25 KHz.

A groove 410 will provide a "stop band" filter with a center frequency that is related to the width and depth of the groove 410 as well as the separation distances from adjacent grooves. In certain embodiments, multiple grooves 410 are formed in the isolator body 322 with each groove 410 having a different center frequency of the associated stop band. In certain embodiments, multiple grooves 410 having the same width are formed in the isolator body 322 in order to provide an increased level of attenuation in the associated stop band.

Transmission of acoustic signals through the isolator body 322 can be treated as a one-dimensional wave passing through a uniform cross-section (the area 604 of the isolator body 322) having an area B. The characteristic acoustic impedance of a uniform body of area B, ignoring reflections, is given by:

$$Z_0 = \frac{\rho\, v}{B} \qquad \text{Equation 1}$$

wherein: V velocity of sound in a material

The speed of sound of a material is determined by the bulk modulus (Young's Modulus of Elasticity) and density of the material according to the equation:

$$v = \sqrt{(E/\rho)} \qquad \text{Equation 2}$$

E bulk modulus of material (pascals; Pa; kg/m-s$^2$)

ρ density of material (mass per volume; kg/m$^3$)

The acoustic impedance of a groove 410 having an aperture 602 with an area A is given by:

$$Z_0 = \frac{\rho\, v}{A}$$

Design of the isolator body 322 requires a more complete analysis, e.g., a numerical computer simulation, that considered the body 322 as a series of acoustic elements, alternating models of a full-thickness area 604 and models of a groove having an area A. In certain embodiments, the models include the acoustic length of that element. In certain embodiments, the simulation includes reflections and resonances.

In certain embodiments, the widths 522, 524, 526 are the same. In certain embodiments, two or more of the widths 522, 524, 526 are different. In certain embodiments, one or more grooves 410 have a first width and one or more other grooves have a second width that is different from the first width. In certain embodiments, each groove 410 has a different width. In certain embodiments, the difference in widths between adjacent grooves is in the range of 5-15% of the nominal width. In certain embodiments, the widths 522, 524, 526 are progressively larger in a monotonic manner along the length of isolator body 322. In certain embodiments, the width of a groove 410 is in the range of 1-3 inches.

Grooves 512 and 514 are separated by separation distance 530 and grooves 514 and 516 are separated by separation distance 532. In certain embodiments, the separation distance 530 and 532 are the same. In certain embodiments, the separation distance 530 and 532 are different. In certain embodiments, the separation distance between adjacent grooves is in the range of 150-400% of the width of the adjacent grooves. In certain embodiments, the separation distances are progressively larger in a monotonic manner along the length of isolator body 322. In certain embodiments, the separation distance between adjacent grooves 410 is in the range of 4-6 inches.

In certain embodiments, the depths 542, 544, 546 are the same. In certain embodiments, two or more of the depths 542, 544, 546 are different. In certain embodiments, two or more of the depths 542, 544, 546 are progressively larger in a monotonic manner along the length of isolator body 322. In certain embodiments, the depth of a groove 410 is on the order of 0.5 inches.

Figure 7:
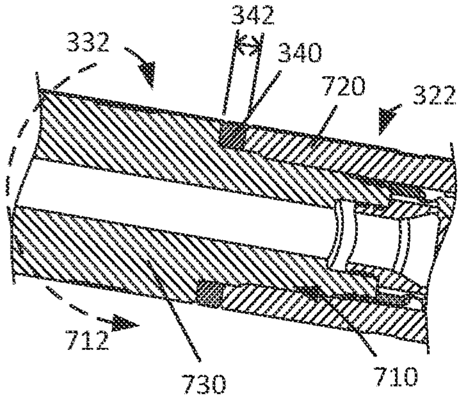
FIG. 7 is a cut-away view of the coupling of the receiver to the isolator, in accordance with various aspects of the subject technology.

FIG. 7 is a cut-away view of the end fitting 730 of the receiver body 332 to the end fitting 720 of the isolator body 322, in accordance with various aspects of the subject technology. In this example, the end fitting 730 is engaged with the end fitting 720 using a threaded joint 710 that is engaged by rotational motion 712 of the receiver body 332 with respect to isolator body 322.

Each of the receiver body 332 and isolator body 322 have an angular reference position (not visible in FIG. 6). In certain embodiments, it is desired to align the angular reference of the receiver body 332 and the angular reference of the isolator body 322 such that one or more related features, e.g., wiring channels, are aligned when the receiver body 332 and isolator body 322 are fully coupled. In certain embodiments, the receiver body 332 and isolator body 322 are fully coupled when torqued to a defined level.

In certain embodiments, a spacer ring 340 is disposed between a portion of the receiver body 332 and a portion of isolator body 322 as shown in FIG. 7. The spacer ring 340 has a thickness 342 that defines a final separation of the receiver body 332 and the isolator body 322 when fully coupled. In certain embodiments, the thickness 342 is selected to provide a predetermined separation of receiver body 332 and the isolator body 322, thereby aligning the angular reference of the receiver body 332 with the angular reference of the isolator body 322 when receiver body 332 and the isolator body 322 when fully coupled.

In certain embodiments, the transmitter collar 210, which comprises the isolator collar 220, and the receiver collar 230 are primarily composed of a first material, e.g., an Inconel, that has a first speed of sound. In certain embodiments. the spacer ring 340 is primarily composed of a different material having a second speed of sound that is different from the first speed of sound. When a wave of acoustic energy passes across the boundary between the first and second materials, it affects certain characteristics of the acoustic energy, e.g., the amplitude and/or phase of the acoustic wave, conducted from an emitter 314 to a sensor 334. In certain embodiments, the material of the spacer ring 340 are selected to provide a speed of sound that is different from the speed of sound of the material of one or more of the collars 210, 220, 230.

Transmission of sound through an interface between two dissimilar materials is affected by the degree of difference in the speed at which sound is conducted through the different materials. The greater the difference, the more the signal is changed, for example by a reduction in amplitude or a shift is the phase of the signal. While it is desirable to attenuate the signal that is passing through the interface, it is also beneficial to change the signal in a way that enables the receiver electronics to distinguish between a signal that has been reflected back from the substrate and the same signal that has been conducted through the tool directly from the emitter to one or more of the sensors, thus enabling the conducted signal to be filtered out of the sensor outputs.

Selection of the material of the spacer ring 240 is limited by the environmental conditions in a wellbore (hot and corrosive) and the structural requirements (strength and stiffness) to support the functional aspects of raising and lowering the drill string 108. Acoustic isolation improves with an increasing difference of the speed of sound between the collars 210, 220, 230 and the spacer ring 240. In certain embodiments, the space ring 240 is one of a metal and a ceramic. Candidate metals for the spacer ring 240 include, but are not limited to, a stainless steel, Inconel, Invar, a copper alloy comprising nickel and tin, a copper allow comprising beryllium, a nickel alloy comprising chromium and molybdenum, a cobalt alloy comprising chromium and tungsten, a tungsten alloy, and a molybdenum alloy.

For example, Inconel has a typical modulus of 200 GPa and a density of 8200 kg/m$^3$, providing a speed of sound of approximately 4940 m/s. Inconel is commonly used for drill string components.

An example spacer ring material is austenitic stainless steel, which has a modulus of 193 GPa and a density of 7850 $kg/m^3$. These are 3.5% and 4.3%, respectively, less than the properties of Inconel. The two changes tend to cancel each other out as they vary in the same direction and are of similar magnitude. Austenitic stainless steel has a speed of sound of approximately 4960 m/s, only 0.4% faster than Inconel.

Another example spacer ring material is Invar, which has a modulus of 135 GPa and a density of 8100 $kg/m^3$. These are 32% and 4.3%, respectively, less than the properties of Inconel. The two changes vary in the same direction but the change in modular is far large than the change in density. Invar has a speed of sound of approximately 4080 m/s, which is 17% slower than Inconel.

Figure 8A:
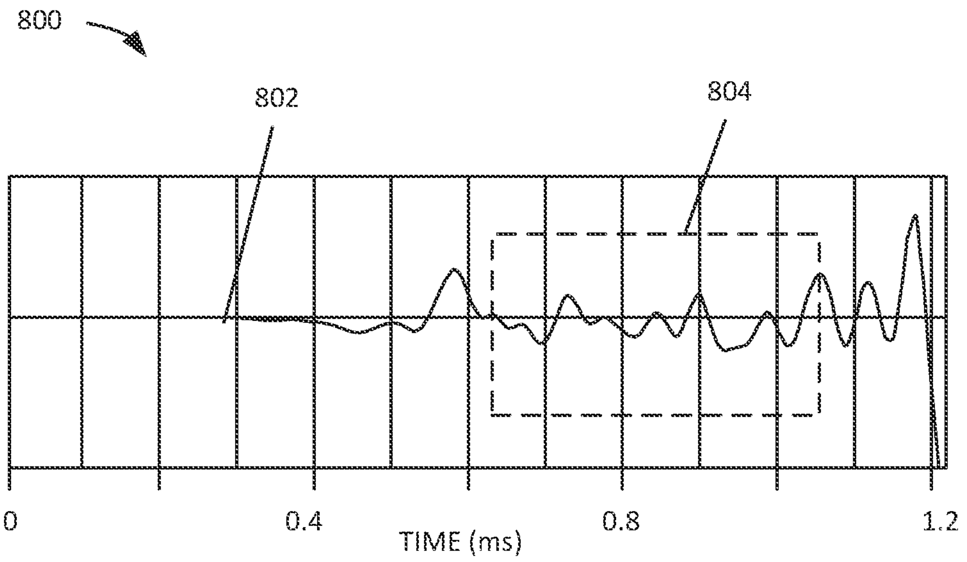
FIGS. 8A-8B depict example data showing attenuation of acoustic signals by an exemplary isolator, in accordance with various aspects of the subject technology.
Figure 8B:
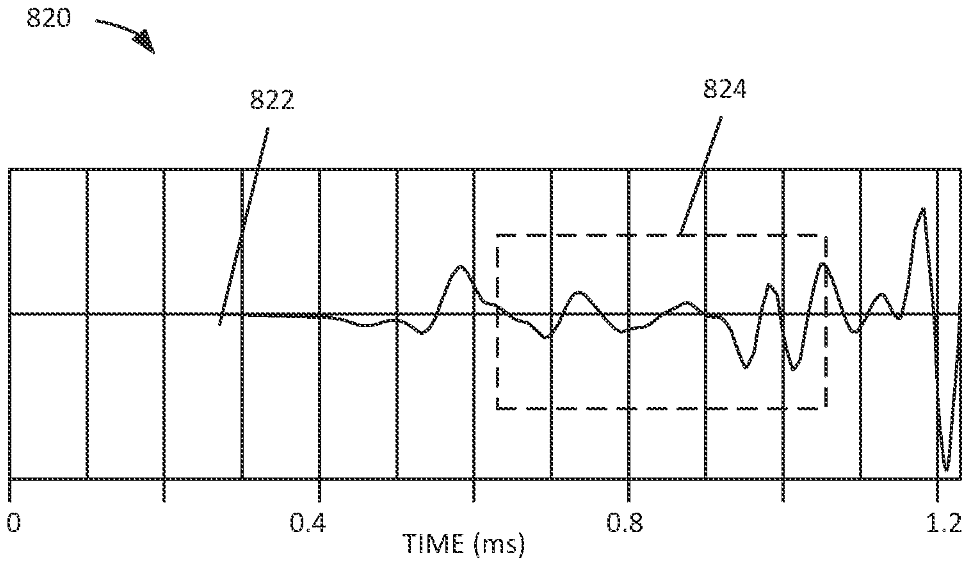

FIGS. 8A-8B depict example data showing attenuation of acoustic signals by an exemplary isolator, in accordance with various aspects of the subject technology. FIG. 8A displays plot 800 of signal 802 that has passed through an isolator body without internal grooves. FIG. 8B is a plot 820 of the output 822 of the same input signal after passing through the same isolator body with six internal grooves. The red boxes 804, 824 indicate the region of interest, wherein the signal 822 shows attenuation of the higher-frequency components compared to the signal 802.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

A method of controlling a drill string having a steerable bit when drilling a wellbore through a substrate, comprising developing a deterministic model of a directional behavior of the drill string comprising a drill string state; one or more drill parameters associated with the drill string; and one or more substrate parameters associated with the substrate. The method also includes developing a SDM of the directional behavior of the drill string by replacing the state and each of the parameters of the deterministic model with respective probability distributions and adding feedback; reducing the SDM to a TSM by substituting a predetermined number of terms of a gPC expansion for each probability distribution and then evaluating the expectations.

A non-transitory computer-readable storage medium comprising instructions for controlling a drill string having a steerable bit when drilling a wellbore through a substrate that, when loaded into a processor, cause the processor to execute the steps of developing a deterministic model of a directional behavior of the drill string comprising a drill string state, one or more drill parameters associated with the drill string, and one or more substrate parameters associated with the substrate. The instructions also cause the processor to execute the steps of developing a SDM of the directional behavior of the drill string by replacing the state and each of the parameters of the deterministic model with respective probability distributions and adding feedback; and reducing the SDM to a TSM by substituting a predetermined number of terms of a gPC expansion for each probability distribution and then evaluating the expectations.

A system for controlling a drill string having a steerable bit when drilling a wellbore through a substrate, comprising a processor and a non-transitory computer-readable storage medium coupled to the processor and comprising instructions that, when loaded into the processor, cause the processor to execute the steps of developing a deterministic model of a directional behavior of the drill string comprising a drill string state, one or more drill parameters associated with the drill string, and one or more substrate parameters associated with the substrate; developing a SDM of the directional behavior of the drill string by replacing the state and each of the parameters of the deterministic model with respective probability distributions and adding feedback; and reducing the SDM to a TSM by substituting a predetermined number of terms of a gPC expansion for each probability distribution and then evaluating the expectations.

What is claimed is:

1. A downhole sensing system, comprising:
a first collar configured to accept a receiver;
a second collar configured to accept a transmitter; and
an acoustic isolator disposed between the first collar and the second collar, the acoustic isolator comprising:
a tubular body having a generally smooth exterior surface and an interior surface with a plurality of circumferential grooves formed in the interior surface that modify the acoustic impedance of the tubular body thereby attenuating an acoustic signal passing through the tubular body; and
a sonde disposed within an interior space of the tubular body and configured to accept an electronics package associated with at least one of the transmitter and the receiver.

2. The downhole sensing system of claim 1, wherein a first groove of the plurality of circumferential grooves has a first width and a second groove of the plurality of circumferential grooves has a second width that is different from the first width.

3. The downhole sensing system of claim 2, wherein a difference between the first width and the second width is in the range of 5-15% of the first width.

4. The downhole sensing system of claim 3, wherein the plurality of circumferential grooves have a respective plurality of different widths that monotonically increase along the tubular body.

5. The downhole sensing system of claim 1, wherein adjacent pairs of the plurality of circumferential grooves are separated by a plurality of separation distances that monotonically increase along the tubular body.

6. The downhole sensing system of claim 5, wherein the separation distances are in the range of 150-400% of the first width.

7. The downhole sensing system of claim 1, further comprising a spacer ring disposed between the first and second collars, wherein:

at least one of the first and second collars is primarily composed of a first material having a first speed of sound; and the spacer ring is primarily composed of a second material having a second speed of sound that is different from the first speed of sound, thereby attenuating an acoustic signal passing between the first and second collars through the spacer ring.

8. The downhole sensing system of claim 7, wherein the second speed of sound is at least 10% different from the first speed of sound.

9. The downhole sensing system of claim 7, wherein the second material is primarily composed of one of the group of a ceramic, a stainless steel, an Inconel™ alloy, Invar, a copper alloy comprising nickel and tin, a copper alloy comprising beryllium, a nickel alloy comprising chromium and molybdenum, a cobalt alloy comprising chromium and tungsten, a tungsten alloy, and a molybdenum alloy.

10. An acoustic isolator comprising:

a tubular body having a generally smooth exterior surface and an interior surface with a plurality of circumferential grooves formed in the interior surface that modify the acoustic impedance of the tubular body thereby attenuating an acoustic signal passing through the tubular body;

a sonde disposed within an interior space of the tubular body and configured to accept an electronics package associated with at least one of a transmitter and a receiver.

11. The acoustic isolator of claim 10, wherein a first groove of the plurality of circumferential grooves has a first width and a second groove of the plurality of circumferential grooves has a second width that is different from the first width.

12. The acoustic isolator of claim 11, wherein a difference between the first width and the second width is in the range of 5-15% of the first width.

13. The acoustic isolator of claim 11, wherein the plurality of circumferential grooves have a respective plurality of widths that monotonically increase along the tubular body.

14. The downhole sensing system of claim 10, wherein adjacent pairs of the plurality of circumferential grooves are separated by a plurality of separation distances that monotonically increase along the tubular body.

15. The downhole sensing system of claim 14, wherein the separation distances are in the range of 150-400% of the first width.

16. The acoustic isolator of claim 10, wherein the acoustic isolator is integrated into one of a first collar comprising a transmitter and a second collar comprising a receiver.

17. A downhole sensing system, comprising:

a first collar comprising a first recess configured to accept a receiver;

a second collar comprising a second recess configured to accept a transmitter;

a spacer ring disposed between the first and second collars; and an acoustic isolator disposed between the first collar and the second collar, the acoustic isolator comprising:

a tubular body having a generally smooth exterior surface and an interior surface with a plurality of circumferential grooves formed in the interior surface that modify the acoustic impedance of the tubular body thereby attenuating an acoustic signal passing through the tubular body; and a sonde disposed within an interior space of the tubular body and configured to accept an electronics package associated with at least one of the transmitter and the receiver;

wherein:

at least one of the first and second collars are primarily composed of a first material having a first speed of sound; and the spacer ring is primarily composed of a second material having a second speed of sound that is different from the first speed of sound, thereby attenuating an acoustic signal passing between the first and second collars through the spacer ring.

18. The downhole sensing system of claim 17, wherein the second material is primarily composed of one of the group of a ceramic, a stainless steel, an Inconel™ alloy, Invar, a copper alloy comprising nickel and tin, a copper alloy comprising beryllium, a nickel alloy comprising chromium and molybdenum, a cobalt alloy comprising chromium and tungsten, a tungsten alloy, and a molybdenum alloy.

* * * * *